L. E. COWEY.
VARIABLE SPEED FRICTION GEARING.
APPLICATION FILED OCT. 4, 1913.
1,124,111.
Patented Jan. 5, 1915.
4 SHEETS—SHEET 4.
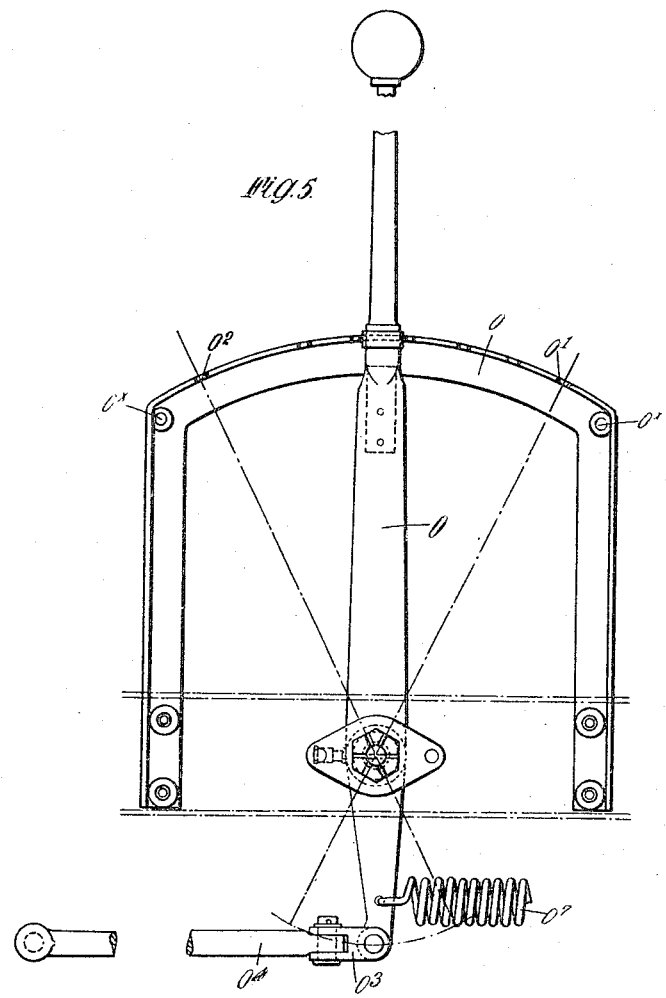
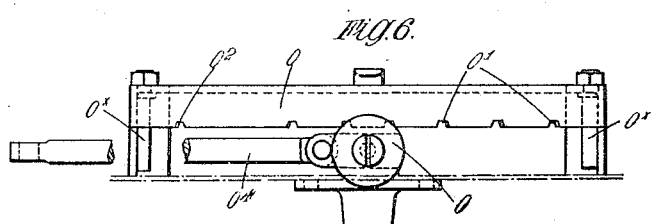
Witnesses:
M. E. McDade.
Inventor
Leonard E. Cowey
by
Attorney

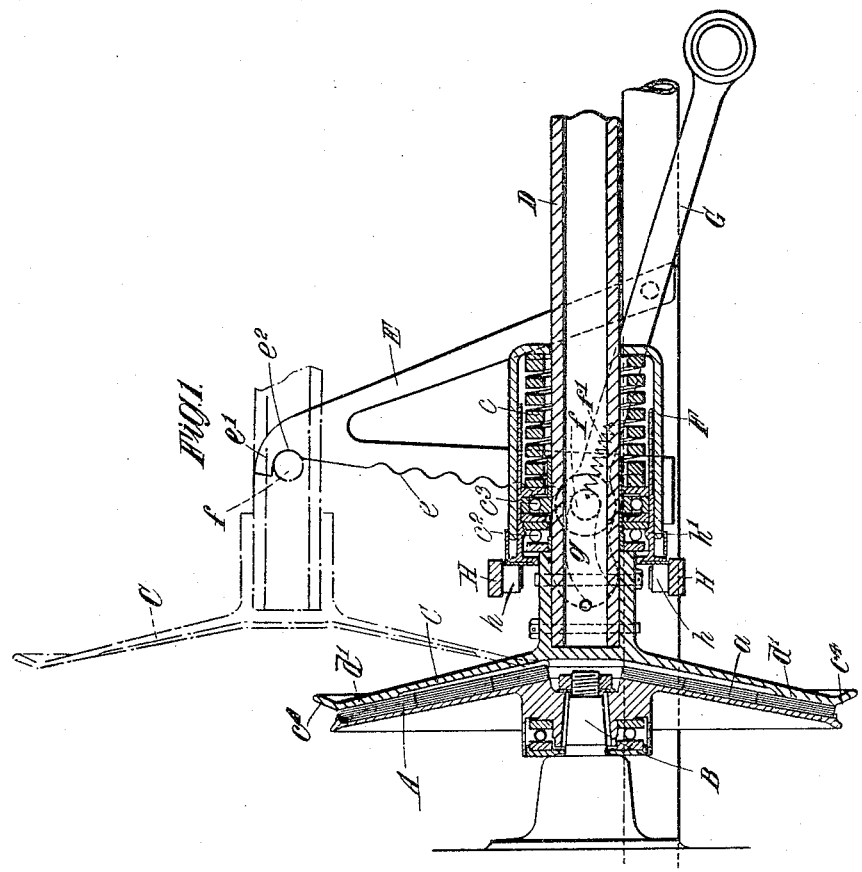

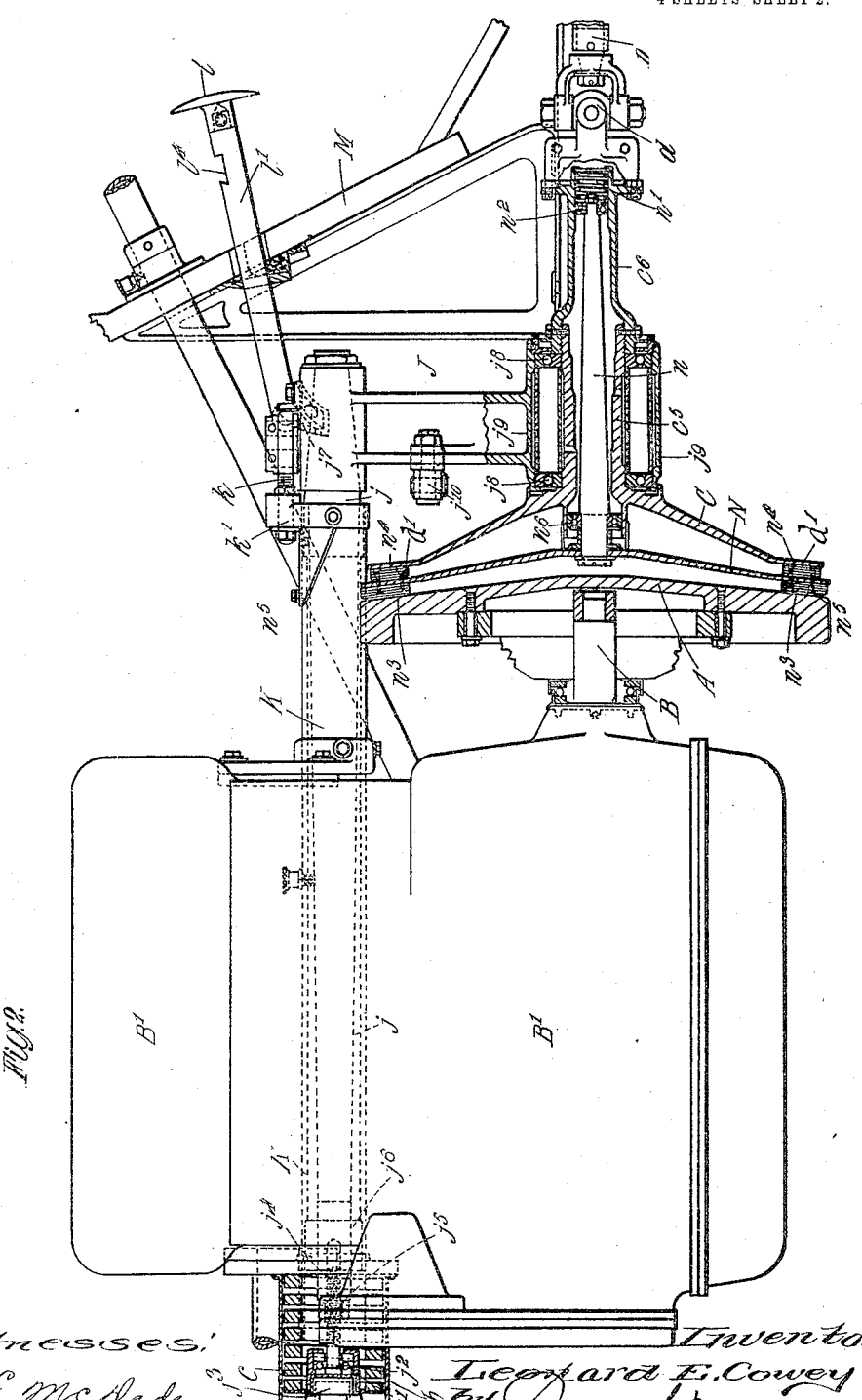

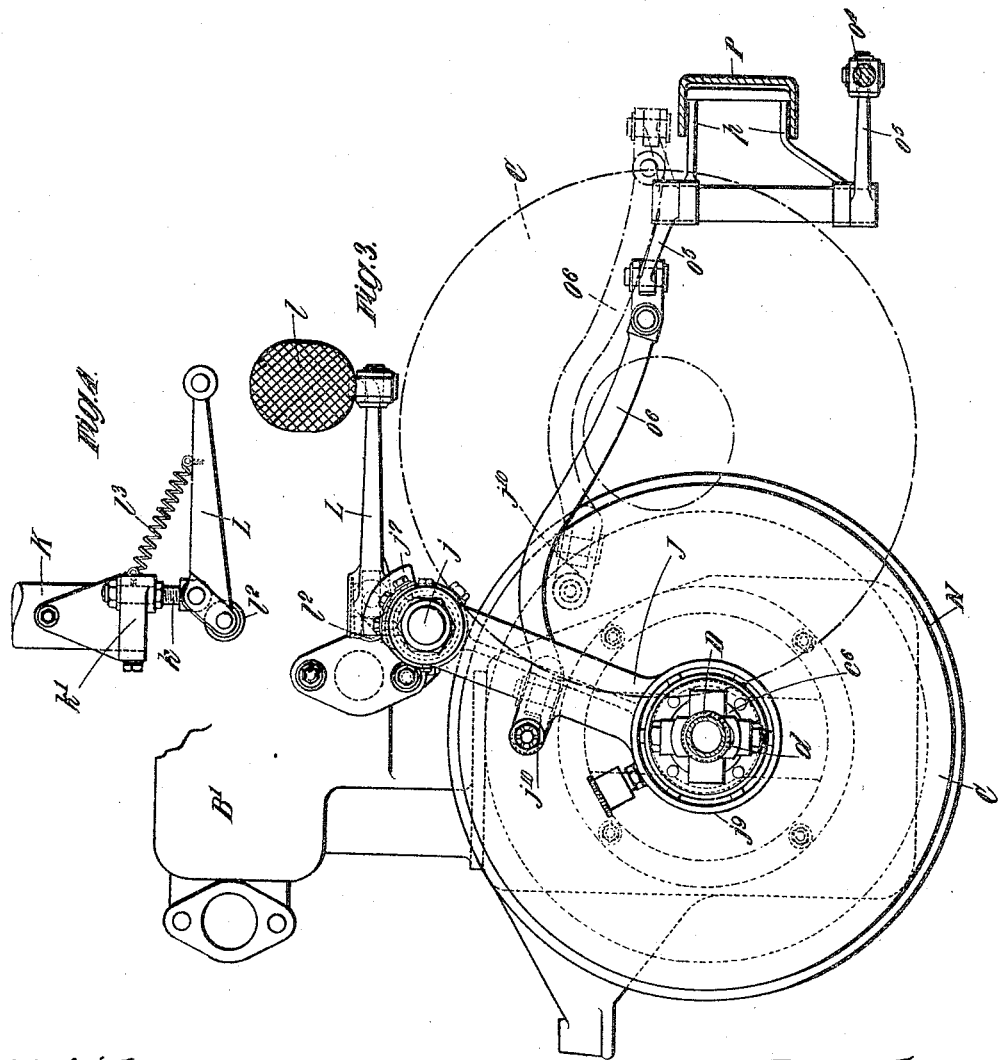

UNITED STATES PATENT OFFICE.

LEONARD EUGENE COWEY, OF KEW GARDENS, ENGLAND.

VARIABLE-SPEED FRICTION-GEARING.

1,124,111.　　　　　Specification of Letters Patent.　　Patented Jan. 5, 1915.

Application filed October 4, 1913.　Serial No. 793,430.

*To all whom it may concern:*

Be it known that I, LEONARD EUGENE COWEY, a subject of the King of Great Britain, residing at Archer Works, Station avenue, Kew Gardens, in the county of Surrey, England, have invented certain new and useful Improvements in Variable-Speed Friction-Gearing, of which the following is a specification.

This invention relates to an improved construction of frictional transmission gearing for use with motor vehicles and more especially with light vehicles, of the kind employing a friction clutch of conical or disk type in which a spring pressed member is movable transversely with relation to the other member, so that the clutch drive, which is through the faces of the members, is more or less eccentric according to the speed desired.

My invention provides several improved features in clutches of this kind. According to one feature the movable clutch member is spring pressed against the second member in such a manner that the pressure exerted by the spring on the clutch surfaces is greater, the more the movable member is displaced, and therefore the more eccentric the drive. According to another feature the movable member is arranged to be moved completely across the axis of the second member and is provided with an annular clutch face adapted to meet the second clutch member at the opposite side of its axis to give a reverse drive.

I may interpose between the two clutch members a cone or disk carried by the movable member but free to turn upon and to move axially with relation to it. This disk has annular clutch faces and transmits the driving power in such a manner that any slip which may occur is taken between it and the movable member, with which it is for all speeds in contact around the whole circumference, the slip being thus taken up over the complete clutch surface while the eccentric driving contact is always a rolling one. Unclutching is effected by moving the movable member, against the pressure of the clutch spring, out of contact with the disk, which remains in contact with the other member under the pressure of a special spring.

As applied to a light motor vehicle the driving clutch member is preferably on the engine shaft and has a conical clutch face. The driven member may be on the Cardan shaft, through which the power is transmitted to the wheel axle, and the said shaft may be moved laterally at the clutch end to change the clutch speed, a retaining device, preferably of rack form, holding the clutch in position. Or the movable clutch member may be carried on an arm sliding along and turning around an axis parallel with the clutch axis to give the desired lateral displacement of the clutch, in which case unclutching may be effected by a lever device acting on a cam face so formed that the unclutching lever starts its operation from approximately the same point for all positions of the clutch.

In order that the said invention may be clearly understood and readily carried into effect I will now proceed to describe the same more fully with reference to the accompanying drawings in which:—

Figure 1 is a longitudinal section through a clutch in which the movable member is mounted on the end of the Cardan shaft. Fig. 2 is a section through a modified construction of clutch, showing it mounted upon the engine casing. Fig. 3 is an elevation partly in section taken at right angles to Fig. 2. Fig. 4 is a detail view of part of the unclutching mechanism; and Figs. 5 and 6 are respectively an elevation and a plan of change speed lever mechanism for use with the clutch.

A is the driving member of the clutch, shown slightly coned and mounted on the end of the engine shaft B.

C is the movable driven member of conical or dished cross section, pressed into clutch position by the spring $c$.

D is the Cardan shaft either carrying or connected to the member C.

Referring to the construction illustrated in Fig. 1, the driven member C is on the end of the Cardan shaft D, through which the power is transmitted to the wheel axle, and has an internally coned face of which a suitable width at the periphery slightly projects to form an annular clutch surface $d'$ adapted to meet any part of the conical clutch face $a$ of the first member A, which face $a$ may be of leather or other suitable clutch material. To hold the end of the Cardan shaft (which is telescopic) and the driven clutch member C in driving connection in any position I employ a fixed abutment or bracket E having a rack face $e$, engaging, in any one of a series of positions, a cross pin or stud $f$ on a sleeve F mounted freely on the shaft D and pressing the shaft forward into clutch engaging position by means of the strong spring $c$ acting through a ball thrust bearing $c^2$. A separate ball bearing $c^3$ may be used to support the shaft in the sleeve. To balance the support two brackets E are preferably employed, one on each side of the sleeve F, the latter having a pin $f$ at each side. The rack teeth are rounded, forming a series of semi-circular depressions receiving the pins, and a pair of forked arms G (of which one only is shown) operated by a change speed lever under the control of the driver, engage by the forks $g$ the pins $f$ and move them, with the sleeve F and shaft D, up or down the rack $e$. To allow of this movement an unclutching device is first operated to draw back the shaft and second clutch member. This device is shown in the form of a ring H encircling the end of the shaft D and pivoted at one side to a bracket on the sleeve. The drawing shows merely the section of the ring, the method of pivoting being obvious. This ring H acts on the clutch spring through a pair of oppositely placed rollers $h$, a sleeve $h'$ inside the sleeve F and the thrust bearing $c^2$, and is operated by a Bowden wire connection from a foot or other lever actuated by the driver. When the clutch is disconnected the end of the shaft D is free to move to any fresh position. The unclutching device is of course used independently of the change speed mechanism whenever the gear is to be disconnected. To keep the sleeve pins $f$ close against the rack $e$ when the clutch is open they may be connected to the forked arms G by light springs $f'$.

The rack is made to slope at such an angle with relation to the angle of the clutch cone that as the clutch member C is moved farther from its normal position the clutch spring $c$ is under greater compression and the clutch surfaces are therefore more firmly pressed together to compensate for the increasing leverage. I obtain a low speed reverse by giving the shaft its maximum displacement, limited by a stop $e'$ on the rack bracket E immediately beyond the last pin recess $e^2$, which recess is used for reversing and is placed some distance beyond the one giving the lowest forward speed. The clutch contact is then made through the rim of the driven member, which rim is provided with a clutch surface $c^4$ at such an angle to the forward driving surface that when the said member is moved to reversing position the said rim surface makes close contact with the driving clutch surface on the other side of the axle, as shown in chain lines in the drawing.

It will be seen that the number of speeds obtainable is limited only by the size of the sleeve cross pins and the recesses in the rack required to accommodate them, and the same simple mechanism is employed at all speeds. The fork $g$ of the arm G is curved so that it can exert pressure on the pin $f$ in the proper direction at any angle to which the arm is moved.

Referring to the construction shown in Figs. 2 to 6 the movable clutch member C is mounted upon the arm J carried on the conical end of the shaft $j$, which shaft can turn and slide within the fixed tubular shaft K mounted upon the engine casing B', along which it passes from end to end. The shaft $j$ may be made to taper toward its front end (the end distant from the clutch) at which end is provided the spring $c$ keeping the movable clutch member C up to its work. The spring $c$ lies between the engine casing and a cup $j'$ acting through a ball thrust bearing $j^2$ on a cap $j^3$ at the end of a screwed pin $j^4$ which screws into the end of the shaft $j$. Locknuts $j^5$ determine the distance to which the pin $j^4$ enters the end of the shaft $j$, the pressure of the spring $c$ being regulated by adjusting the nuts $j^5$ on the pin before screwing the latter into place. The spring and other parts are inclosed in a dust proof sheath $b$ on the engine casing B'. The tapering form of the shaft $j$ allows the weight to be reduced without reducing the strength at the arm end, where the chief stresses have to be taken. The tapered end is supported in the bush $j^6$ inside the end of the hollow shaft K.

The unclutching mechanism consists of an unclutching lever L, with pedal $l$ and pedal bar $l'$, pivoted on a pin $k$ carried adjustably by the bracket $k'$ on the end of the fixed tubular shaft K, the lever L carrying a roller $l^2$ bearing against a scroll or cam piece $j^7$ on the boss of the arm J. A tension spring $l^3$ keeps the roller $l^2$ up to the cam piece $j^7$. The bar $l'$ passes through a slot in the dash board M and a notch $l^4$ serves to hold the bar in unclutching position. The cam piece $j^7$ is so shaped as to allow the unclutching lever L to act from an approximately constant position in spite of the fact that the clutch arm J is pressed back by the conical clutch faces to an extent depending on the angular displacement of the arm and thus on the speed to which the gear is set. Owing to the conical form of the clutch the spring maintaining the clutch in action is more compressed and thus more powerful the greater the displacement of the movable clutch member from the center and therefore the greater the ratio between the speeds of the driving and driven members.

A further feature of the apparatus shown in Figs. 2 and 3 (which feature is also applicable to the arrangement shown in Fig. 13)

1) relates to an improved construction of the movable clutch member, which, among other advantages, prevents unequal or undue wear of the clutch faces. Instead of, as in the previous construction, allowing the annular clutch surface of the movable member to roll directly on the driving clutch surface I interpose between the clutch members a disk or shallow cone N carried by the movable member C but free to turn upon it and to move axially with relation to it. The disk is supported by means of a long stem $n$ passing through the clutch member and its hollow spindle $c^5$, to the end of which is fixed a tubular extension $c^6$ connected through a universal joint $d$ to the Cardan shaft D. A spring $n'$ bears through a ball bearing $n^2$ on the said stem $n$ to maintain the disk N permanently against the driving clutch member. The disk has annular clutch faces $n^3$, $n^4$ near its periphery on each side, the face $n^3$ having a narrow oppositely sloping beveled clutch face $n^5$ for reverse driving, as in the construction previously described, in which construction, however, the reverse clutch face is directly on the driven clutch member C. This member in the present construction has an annular clutch face $d'$ bearing on the back face $n^4$ of the disk. The clutch face $d'$ of the driven member is thus in engagement over its whole surface with the face $n^4$ and any slip which may occur is taken by this face owing to the fact that the clutch face $n^3$ is in rolling and not in sliding contact with the surface of the driving member, so that the frictional resistance to slip is a maximum. The pressure on the face $n^3$ is moreover increased by the spring $n'$. When the clutch is open the disk N remains in contact with the driving member and turns freely with it, the unclutching action lifting the movable member C from the back of the disk, the spindle $n$ of which can both slide and turn in the hollow spindle $c^5$ and extension $c^6$ by means of the sliding ball bearings $n^2$ and $n^6$. Thus, on closing the clutch again the slip is not taken by the driving member, which may have only a small surface at one side in action, but is between the full annular clutch surface $d'$ of the driven member C and the face $n^4$ of the disk. The tubular stem $c^5$ of the member C is mounted in ball bearings $j^8$ in a sleeve $j^9$ on the end of the arm J.

The movement of the clutch member C is effected by the change speed lever O shown in Figs. 5 and 6, moving in the quadrant $o$ provided with the various speed notches $o'$ and the reverse notch $o^2$, in any one of which a finger on the lever engages. The speeds given by the notches $o'$ increase with the distance of a notch from the reverse notch $o^2$, the most distant notch $o'$ giving top speed with co-axial position of the clutch members A and C. To disengage the lever finger from a notch the lever itself may be sprung outward, the lower end of the lever being flattened to allow of slight bending. A stop prevents the lever being pulled out too far. Stops $o^x$ limit the stroke of the lever in either direction and thus limit the movement of the clutch member C. The lower end of the lever O is connected through a universal joint $o^3$ to a rod $o^4$ which controls a double armed lever $o^5$ (Fig. 3) mounted in a bracket $p$ on the vehicle frame P. The second arm of this lever $o^5$ is connected by the curved connecting rod $o^6$ to the brackets $j^{10}$ on the arm J, so that the clutch member C may be moved to any position between the extremes shown in full and chain lines in Fig. 3, the position in chain lines being that for reverse, in which the edge of the member C is displaced beyond the center of the driving member A. The lever O is connected at its lower end to a fixed point by the spring $o^7$, which serves as a compensating spring to make the action of the lever easier in moving the clutch member C away from the fixed clutch axis, the force required being greater in this direction than in the opposite one.

I have referred to the movable clutch member as the driven one, but in some kinds of gearing it may be necessary to reverse the function of the two clutch members as hereinbefore described. Such a change, however, does not alter the nature of the invention.

The conical form of the clutch shown in the drawings is one which has been found convenient in practice but I do not limit myself to any angle of cone, which angle may vary greatly within practicable limits.

What I claim and desire to secure by Letters Patent of the United States is:—

1. In a variable transmission gearing, a friction clutch comprising two members of which one is movable transversely across the face of the other, a spring adapted to press the said members together and means for increasing the pressure of the spring as the transverse displacement of the movable member increases.

2. In a variable transmission gearing, a friction clutch comprising two members of which one is movable transversely across the face of the other, a fixed bracket having a rack face, a support for the said movable member, a spring pressing the member into clutch contact and means for engaging the said support with the face of the bracket at any desired point.

3. In a variable transmission gearing, a friction clutch comprising two members of which one is movable transversely across the face of the other, a support for the said movable member, a clutch spring, means for moving the said support and member transversely across the clutch axis, a fixed bracket having recesses in its face adapted to engage the said support and hold the movable member in any one of a series of forward driving positions and an additional recess retaining the said member in reversing position.

4. In a variable transmission gearing, a friction clutch comprising two members of which one is movable transversely across the face of the other, a clutch spring, a sleeve carrying the movable member and an unclutching lever device mounted on the said sleeve and adapted to press back the clutch spring.

5. In a variable transmission gearing, a friction clutch comprising two members of which one is movable transversely across the face of the other, and an intermediate clutch member mounted to turn and slide with relation to the movable member and adapted to engage frictionally with both members.

6. In a variable transmission gearing, a friction clutch comprising two members of which one is movable transversely across the face of the other, an intermediate clutch member mounted freely on the movable member and a spring maintaining contact between the intermediate and the stationary clutch members on unclutching.

7. In a variable transmission gearing, a friction clutch comprising two members of which one is movable transversely across the face of the other, a clutch disk between the two clutch members, a stem on the said disk, a hollow spindle on the movable member receiving the said stem, and a spring within the said spindle adapted to press the disk on the stationary clutch member.

8. In a variable transmission gearing, a friction clutch comprising two members of which one is movable transversely across the face of the other, an intermediate clutch member mounted to turn and slide with relation to the movable member and adapted to engage frictionally with both members and provided with an annular clutch surface adapted to make contact with the stationary member at the opposite side of the axis, to give a reverse drive.

9. In a variable transmission gearing, a friction clutch comprising two members of which one is movable transversely across the face of the other, a fixed shaft parallel to the clutch axis, an arm on the said shaft carrying the movable clutch member and adapted to turn and slide with relation to the said shaft and a spring acting axially on the arm to press the movable member into clutch contact.

10. In a variable transmission gearing, a friction clutch comprising a pair of conical members of which one is movable transversely across the face of the other, a fixed shaft parallel to the clutch axis, a spring pressed arm on the said shaft carrying the movable conical member, an unclutching device and a cam piece belonging to the said arm and acted on by the unclutching device, so formed that the unclutching device starts its operation from approximately the same point for all positions of the clutch.

11. In a variable transmission gearing, a friction clutch comprising two members of which one is movable transversely across the face of the other, an engine driving the stationary member, a fixed hollow shaft mounted on the engine casing parallel to the clutch axis, an arm carrying the movable clutch member, a spindle carrying the said arm and passing through the fixed hollow shaft within which it is free to turn and slide and a spring between the ends of the said shaft and spindle adapted to maintain the spindle, arm and movable clutch member in clutch position.

In testimony whereof I affix my signature in presence of two witnesses.

LEONARD EUGENE COWEY.

Witnesses:
J. I. IRELAND,
W. J. BARRETT.

Copies of this patent may be obtained for five cents each, by addressing the "Commissioner of Patents, Washington, D. C."